United States Patent
Magwood et al.

(10) Patent No.: US 11,925,982 B2
(45) Date of Patent: Mar. 12, 2024

(54) METHODS AND SYSTEMS FOR THREE-DIMENSIONAL PRINTING

(71) Applicant: Holo, Inc., Newark, CA (US)

(72) Inventors: Leroy Magwood, Oakland, CA (US); Brian Adzima, Hayward, CA (US)

(73) Assignee: HOLO, INC., Newark, CA (US)

(*) Notice: Subject to any disclaimer, the term of this patent is extended or adjusted under 35 U.S.C. 154(b) by 100 days.

(21) Appl. No.: 17/397,058

(22) Filed: Aug. 9, 2021

(65) Prior Publication Data
US 2022/0032372 A1 Feb. 3, 2022

Related U.S. Application Data (63) Continuation of application No. PCT/US2020/017510, filed on Feb. 10, 2020.
(Continued)

(51) Int. Cl.
*B22F 10/12* (2021.01)
*B22F 3/10* (2006.01)
(Continued)

(52) U.S. Cl.
CPC .......... *B22F 10/12* (2021.01); *B22F 3/1021* (2013.01); *B22F 10/14* (2021.01); *B22F 10/28* (2021.01);
(Continued)

(58) Field of Classification Search
CPC .......... B22F 10/12; B22F 10/20; B22F 10/18; B22F 10/10; B22F 10/28; B22F 3/1021; B33Y 10/00; B33Y 70/10; B33Y 70/00
See application file for complete search history.

(56) References Cited

U.S. PATENT DOCUMENTS

| | | |
|---|---|---|
| 4,269,933 A | 5/1981 | Pazos |
| 4,814,370 A | 3/1989 | Kramer et al. |
| | (Continued) | |

FOREIGN PATENT DOCUMENTS

| | | |
|---|---|---|
| CN | 1418974 A | 5/2003 |
| CN | 1803348 A | 7/2006 |
| | (Continued) | |

OTHER PUBLICATIONS

Xing et al. ("Effect of plasticizer on the fabrication and properties of alumina ceramic by stereolithography-based additive manufacturing." Ceramics International 44.16 (2018): 19939-19944.) (Year: 2018).*

(Continued)

*Primary Examiner* — Ricardo D Morales
(74) *Attorney, Agent, or Firm* — Wilson Sonsini Goodrich & Rosati (57) ABSTRACT

The present disclosure provides methods for generating three-dimensional (3D) objects. The methods may comprise generating a green part corresponding to the 3D object. The green part may comprise a plurality of particles and reactants for conducting a self-propagating reaction. The reactants may be used to conduct a self-propagating reaction that generates heat sufficient to de-bind or pre-sinter the green part. External heat may be supplied to the green part to sinter the plurality of particles, thereby yielding the 3D object. The disclosure also provides methods for generating a 3D object using a resin. The methods may comprise using the resin to generate a green part, heating the green part at a first temperature to decompose a binder in the green part, heating the green part at a second temperature to decompose a polymeric material in the green part, and sintering the green part to yield the 3D object.

20 Claims, 3 Drawing Sheets

Related U.S. Application Data (60) Provisional application No. 62/803,766, filed on Feb. 11, 2019.

(51) Int. Cl.
  *B22F 10/14* (2021.01)
  *B22F 10/28* (2021.01)
  *B22F 10/36* (2021.01)
  *B33Y 10/00* (2015.01)
  *B33Y 70/10* (2020.01)

(52) U.S. Cl.
  CPC .......... *B22F 10/36* (2021.01); *B22F 2203/11* (2013.01); *B33Y 10/00* (2014.12); *B33Y 70/10* (2020.01)

(56) References Cited

U.S. PATENT DOCUMENTS

| | | |
|---|---|---|
| 5,047,181 A | 9/1991 | Occhionero et al. |
| 5,143,668 A | 9/1992 | Hida et al. |
| 5,330,701 A | 7/1994 | Shaw et al. |
| 5,391,460 A * | 2/1995 | Dougherty ............ G03F 7/0048 430/269 |
| 6,008,281 A * | 12/1999 | Yang ........................ B22F 1/10 419/36 |
| 6,093,761 A | 7/2000 | Schofalvi et al. |
| 6,117,612 A | 9/2000 | Halloran et al. |
| 6,204,316 B1 | 3/2001 | Schofalvi et al. |
| 6,376,585 B1 | 4/2002 | Schofalvi et al. |
| 6,846,862 B2 | 1/2005 | Schofalvi et al. |
| 8,110,135 B2 | 2/2012 | El-Siblani |
| 8,734,715 B2 | 5/2014 | Miller et al. |
| 10,328,491 B2 | 6/2019 | Heikkila |
| 10,919,217 B2 | 2/2021 | Nauka et al. |
| 2004/0075197 A1 | 4/2004 | Tang |
| 2006/0163774 A1 | 7/2006 | Abels et al. |
| 2013/0307175 A1 | 11/2013 | Tang |
| 2016/0271878 A1 | 9/2016 | Nuechterlein et al. |
| 2018/0057414 A1 | 3/2018 | O'Brien et al. |
| 2018/0133955 A1 | 5/2018 | Gibson |
| 2018/0162047 A1 | 6/2018 | Gibson et al. |
| 2018/0162048 A1 | 6/2018 | Gibson et al. |
| 2018/0304360 A1 | 10/2018 | Fontana et al. |
| 2018/0305266 A1 * | 10/2018 | Gibson ................. B33Y 40/20 |

FOREIGN PATENT DOCUMENTS

| | | |
|---|---|---|
| CN | 101068503 A | 11/2007 |
| CN | 101956091 A | 1/2011 |
| CN | 102076628 A | 5/2011 |
| CN | 102528039 A | 7/2012 |
| CN | 102171305 B | 7/2013 |
| CN | 103317140 A | 9/2013 |
| CN | 104609859 A | 5/2015 |
| CN | 104923781 A | 9/2015 |
| CN | 104725050 B | 1/2017 |
| CN | 104923781 B | 3/2017 |
| CN | 107530901 A | 1/2018 |
| CN | 107573058 A | 1/2018 |
| CN | 108602118 A | 9/2018 |
| JP | 2017210620 A | 11/2017 |
| JP | 6241944 B2 | 12/2017 |
| WO | WO-0200569 A2 | 1/2002 |
| WO | WO-2007020634 A2 | 2/2007 |
| WO | WO-2018047479 A1 | 3/2018 |
| WO | WO-2018151995 A1 | 8/2018 |
| WO | WO-2020167665 A1 | 8/2020 |

OTHER PUBLICATIONS

Deckers et al., Direct selective laser sintering/melting of high density alumina powder layers at elevated temperatures, Physics Procedia; vol. 56, pp. 117-124 (2014).
PCT/US20/17510 Search Report & Written Opinion dated Jun. 18, 2020.
Dvornic, P. High Temperature Stability of Polysiloxanes. Silicon Compounds: Silanes and Silicones 4000A. Jan. 2008. pp. 419-431.
EP20755173.0 European Search Report and Opinion dated Oct. 20, 2022.
Varma et al. Solution Combustion Synthesis of Nanoscale Materials. Chem Rev. Dec. 14, 2016;116(23):14493-14586.

* cited by examiner

METHODS AND SYSTEMS FOR THREE-DIMENSIONAL PRINTING

CROSS-REFERENCE

This application is a continuation of International Patent Application No. PCT/US2020/017510, filed Feb. 10, 2020, which claims the benefit of U.S. Patent Application No. 62/803,766, filed Feb. 11, 2019, which is entirely incorporated herein by reference.

BACKGROUND

Three-dimensional (3D) printing techniques have been rapidly adopted for a number of different applications, including rapid prototyping and fabrication of specialty components. Some 3D printing technologies use metal or ceramic particles mixed with organic compounds (e.g., polymers) to create green parts that are in the shape of a 3D object. These green parts may undergo a de-binding process to remove the organic compounds holding the metal or ceramic particles in a desired shape, and then a sintering operation to fuse the metal or ceramic particles together to form the 3D object. One approach for de-binding is thermal decomposition, during which the green part may be heated in a furnace to evaporate organic components. After de-binding organic compounds from the green part, the green part may be heated in the furnace at a temperature sufficient to sinter particles in the green part.

SUMMARY

Recognized herein are various limitations with methods currently available for de-binding and sintering. For example, thermal decomposition may involve lengthy, high-temperature heating procedures, during which a green part may experience high thermal stress and may be prone to cracks or deformations. As another example, during a sintering process, it may be difficult to control the diffusion of particles or atoms (e.g., because particles or atoms may move in the green part such that a shape of the three-dimensional (3D) object changes relative to a predetermined or desired shape).

Provided herein are methods and systems for printing a 3D object. In an example, a method for printing a 3D object includes generating a green part comprising particles (e.g., metal or ceramic particles) and a binding substance (e.g. a binder). A self-sustained exothermic reaction may be used through the green part to remove the binding substance and in some cases to at least partially fuse the particles, in some cases without continuous exposure to external sources of energy. Such self-propagating reactions may allow for improved control over the rate and temperature at which de-binding occurs. Next, the green part may be heated to subject the particles to conditions sufficient to sinter the particles, thereby yielding the 3D object.

In an aspect, the present disclosure provides a method for generating a three-dimensional (3D) object, the method comprising: (a) generating a green part corresponding to the 3D object, wherein the green part comprises a plurality of particles and reactants for conducting a self-propagating reaction in the green part to yield heat; (b) using the reactants to conduct the self-propagating reaction to generate heat in the green part, wherein the heat is sufficient to de-bind or pre-sinter the green part; and (c) subsequent to (b), supplying heat to the green part from a location external to the green part, to sinter the plurality of particles, thereby yielding the 3D object.

In some embodiments, the plurality of particles may comprise at least one metal particle, at least one ceramic particle, or a combination thereof.

In some embodiments, the heat in (b) may be sufficient to de-bind the green part. In some embodiments, the heat in (b) may be sufficient to pre-sinter the green part.

In some embodiments, the reactants may comprise an oxidizer, a fuel, and/or a solvent. In some embodiments, the oxidizer may be nitric acid, ammonium nitrate, a metal nitrate, a nitrate hydrate, a functional variant thereof, or a combination thereof. In some embodiments, the fuel may be urea, glycine, sucrose, glucose, citric acid, carbohydrazide, oxalyldihydrazide, hexamethylenetetramine, acetylacetone, a functional variant thereof, or a combination thereof. In some embodiments, the solvent may be water, kerosene, benzene, ethanol, methanol, furfuryl alcohol, 2-methoxyethanol, formaldehyde, a functional variant thereof, or a combination thereof.

In some embodiments, the green part in (a) may be generated using at least one resin. In some embodiments, the at least one resin may comprise a polymeric precursor and a photoinitiator. In some embodiments, the at least one resin may comprise a photoinhibitor. In some embodiments, the at least one resin may comprise the plurality of particle or the reactants.

In some embodiments, the method may further comprise, in (b), supplying an external energy to the reactants of the green part to initiate the self-propagating reaction to generate the heat. In some embodiments, the external energy may be provided through a light source. In some embodiments, the light source may be a laser or a source of ultraviolet energy. In some embodiments, the external energy may be provided through a source of thermal energy. In some embodiments, the source of thermal energy may provide thermal energy through resistive heating.

In some embodiments, the heat in (c) may be supplied by a light source. In some embodiments, the light source may be a laser or a source of ultraviolet energy.

In another aspect, the present disclosure provides a green part for forming a three-dimensional (3D) object. The green part may comprise a plurality of particles and reactants for conducting a self-propagating reaction in the green part to yield heat in the green part sufficient to de-bind or pre-sinter the green part.

In some embodiments, the plurality of particles may comprise at least one metal particle, at least one ceramic particle, or a combination thereof.

In some embodiments, the reactants may comprise an oxidizer, a fuel, or a solvent.

In some embodiments, the oxidizer may be nitric acid, ammonium nitrate, a metal nitrate, a nitrate hydrate, a functional variant thereof, or a combination thereof.

In some embodiments, the fuel may be urea, glycine, sucrose, glucose, citric acid, carbohydrazide, oxalyldihydrazide, hexamethylenetetramine, acetylacetone, a functional variant thereof, or a combination thereof.

In some embodiments, the solvent may be water, kerosene, benzene, ethanol, methanol, furfuryl alcohol, 2-methoxyethanol, formaldehyde, a functional variant thereof, or a combination thereof.

In some embodiments, the green part may be generated using at least one resin. In some embodiments, the at least one resin may comprise the plurality of particles and the reactants. In some embodiments, the at least one resin may comprise a polymeric precursor and a photoinitiator. In some embodiments, the at least one resin may comprise a photoinhibitor.

In some embodiments, the self-propagating reaction may be initiated using a source of external energy configured to supply external energy to the reactants.

In some embodiments, the external energy may be provided through a light source. In some embodiments, the light source may be a laser or a source of ultraviolet energy.

In some embodiments, the external energy may be provided through a source of thermal energy. In some embodiments, the source of thermal energy may provide thermal energy through resistive heating.

In a different aspect, the present disclosure provides a method for generating a three-dimensional (3D) object, the method comprising: (a) providing adjacent to a build surface a resin comprising (i) a binder configured to decompose at a first temperature, (ii) a polymeric precursor configured to form a polymeric material, wherein the polymeric material is configured to decompose at a second temperature that is greater than the first temperature, and (iii) a plurality of particles; (b) using the resin to generate a green part corresponding to the 3D object, wherein the green part comprises the binder, the polymeric material, and the plurality of particles; (c) heating the green part at the first temperature to decompose at least a portion of the binder and to generate one or more pores in the green part, which green part comprises the plurality of particles and the polymeric material; and (d) subsequent to (c), heating the green part at or above the second temperature to decompose at least a portion of the polymeric material, thereby generating the 3D object comprising the plurality of particles.

In some embodiments, the plurality of particles may comprise at least one metal particle, at least one ceramic particle, or a combination thereof.

In some embodiments, the heating in (d) may subject the plurality of particles to sintering. In some embodiments, the heating in (c) may not decompose the polymeric material. In some embodiments, the heating in (c) may yield at least one continuous porous network in the green part, which at least one continuous porous network comprises the one or more pores.

In some embodiments, the polymeric material may be removable through the one or more pores when the green part is heated at or above the second temperature.

In some embodiments, the resin in (a) may further comprise at least one photoinitiator configured to initiate formation of the polymeric precursor into the polymeric material. In some embodiments, the method may further comprise, in (b), exposing the resin adjacent to the build surface to a first light under conditions sufficient to cause the at least one photoinitiator to initiate formation of the polymeric material from the polymeric precursor.

In some embodiments, the resin in (a) may further comprise at least one photoinhibitor configured to inhibit formation of the polymeric material from the polymeric precursor. In some embodiments, the method may further comprise, in (b), exposing the resin adjacent to the build surface to a second light under conditions sufficient to cause the at least one photoinhibitor to inhibit formation of the polymeric material adjacent to the build surface.

In some embodiments, the at least the portion of the binder in (c) may decompose into a gas. In some embodiments, the gas may comprise carbon monoxide, carbon dioxide, water, or formaldehyde. In some embodiments, the binder may comprise poly(propylene carbonate) or paraformaldehyde.

In some embodiments, the first temperature may be from 150 degrees Celsius to 350 degrees Celsius. In some embodiments, the second temperature may be greater than or equal to 400 degrees Celsius. In some embodiments, the second temperature may be greater than or equal to 500 degrees Celsius.

In some embodiments, the method may further comprise, in (b), directing light to the resin to form the polymeric material from the polymeric precursor. In some embodiments, the build surface may comprise a transparent or semi-transparent window. In some embodiments, the light may be directed through the transparent or semi-transparent window.

In some embodiments, the polymeric material may be removable through the one or more pores when the green part is heated at or above the second temperature.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In an aspect, the present disclosure provides a method for generating a three-dimensional (3D) object. The method may comprise generating a green part corresponding to the 3D object. The green part may comprise a plurality of particles and reactants for conducting a self-propagating reaction in the green part that generates heat. Next, the reactants may be used to conduct the self-propagating reaction to generate heat in the green part. Such heat may be sufficient to de-bind and/or pre-sinter the green part. Next, heat may be supplied to the green part from a location external to the green part to sinter the plurality of particles. This may yield the 3D object.

A green part may be a part that holds a plurality of particles together before the plurality of particles are fused together (e.g., through sintering) to create a 3D object comprising the plurality of particles. The green part may not be the final 3D object (i.e., further processing may be needed to generate the 3D object from the green part or a derivative of the green part). The green part may be an intermediate object formed prior to formation of the 3D object. The green part may correspond to a 3D object that is printed using any of the 3D printing methods disclosed herein, including fused deposition modeling (FDM), fused filament fabrication (FFF), selective laser sintering (SLS), material jetting (MJ), drop on demand, binder jetting, direct metal laser sintering (DMLS), selective laser melting (SLM), electron beam melting (EBM), direct light processing (DLP), and/or stereolithography (SLA). A green part may correspond to the shape and/or size of the 3D object or may correspond to the shape and/or size of a portion of the 3D object. In some cases, the green part may have the same shape and/or dimensions as the 3D object. In other cases, the green part may have a similar shape to the 3D object and dimensions that are proportional to the dimensions of the 3D object. The green part may comprise a polymeric material and a plurality of particles (e.g., metal, ceramic, or both) that are encapsulated by the polymeric material. The polymeric material may be a polymer (or polymeric) matrix. The polymeric material may be created by polymerizing monomers into the polymeric material and/or cross-linking oligomers into the polymeric material, as described in further detail elsewhere herein. The plurality of particles may be encapsulated in the polymer (or polymeric) matrix. The plurality of particles may be capable of sintering or melting. The green part may be self-supporting. The green part may be heated in a heater (e.g., in a furnace) to burn off and/or vaporize at least a portion of the polymeric material and to coalesce the plurality of particles into the 3D object or into at least a portion of the 3D.

The green part may comprise a plurality of particles. The plurality of particles may comprise at least one metal particle, at least one ceramic particle, or a combination thereof. The at least one metal particle may comprise one or more elements selected from the group consisting of aluminum, platinum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. In some cases, the at least one metal particle may comprise an intermetallic material. An intermetallic material may be a solid-state compound exhibiting metallic bonding, defined stoichiometry and ordered crystal structure (i.e., alloys). The intermetallic materials may be in prealloyed powder form. Examples of such prealloyed powders may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and/or stainless steel (iron, carbon, and additional elements including manganese, nickel, chromium, molybdenum, boron, titanium, silicon, vanadium, tungsten, cobalt, and/or niobium). In some cases, the prealloyed powders may include superalloys. The superalloys may be based on elements including iron, nickel, cobalt, chromium, tungsten, molybdenum, tantalum, niobium, titanium, and/or aluminum.

The at least one ceramic particle may comprise metal (e.g., aluminum, platinum, titanium, etc.), non-metal (e.g., oxygen, nitrogen, etc.), and/or metalloid (e.g., germanium, silicon, etc.) atoms primarily held in ionic and/or covalent bonds. A metal may be any element selected from the group consisting of aluminum, platinum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. A non-metal may be any element selected from the group consisting of hydrogen, carbon, nitrogen, oxygen, phosphorus, sulfur, selenium, fluorine, chlorine, bromine, iodine, astatine, tennessine, helium, neon, argon, krypton, xenon, radon, and oganesson. A metalloid may be any element selected from the group consisting of arsenic, tellurium, germanium, silicon, antimony, boron, polonium, astatine, and selenium. The at least one ceramic particle may comprise a ceramic material. The ceramic material may be, for example, aluminide, boride, beryllia, carbide, chromium oxide, hydroxide, sulfide, nitride, mullite, kyanite, ferrite, titania zirconia, yttria, and/or magnesia.

The plurality of particles may have various shapes and/or sizes. For example, a particle may be in the shape of a sphere, cuboid, or disc, or any partial shape or combination of shapes thereof. The particle may have a cross-section that is circular, triangular, square, rectangular, pentagonal, hexagonal, or any partial cross-section or combination of cross-sections thereof. The particle may have a size corresponding to a cross-sectional dimension of the particle. A cross-sectional dimension of the particle may be from about 1 nanometers (nm) to about 500 micrometers (μm). The cross-sectional dimension of the particle may be at least about 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μM, 400 μm, 500 μm, or greater, or a range between any two of the preceding values (e.g., a cross-sectional dimension from about 1 nm to 100 nm). The cross-sectional dimension of the particle may be at most about 500 μm, 400 μm, 300 μm, 200 μm, 100 μm, 90 μm, 80 μm, 70 μm, 60 μm, 50 μm, 40 μm, 30 μm, 20 μm, 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, or smaller, or a range between any two of the preceding values (e.g., a cross-sectional dimension from about 1 nm to 100 nm).

The green part may comprise a polymeric material. The polymeric material may be a polymer (or polymeric) matrix. The polymeric material may be created by polymerizing monomers into the polymeric material and/or cross-linking oligomers into the polymeric material, as described in further detail elsewhere herein. In some cases, the polymeric material may encapsulate the plurality of particles in the green part.

The green part may comprise a binder. The binder may be any compound or resin that retains or partially retains the plurality of particles comprising the green part in a shape corresponding to the 3D object or a portion of the 3D object.

The green part may be generated using one or more 3D printing methods. A 3D printing method may include fused deposition modeling (FDM), fused filament fabrication (FFF), selective laser sintering (SLS), material jetting (MJ), drop on demand, binder jetting, direct metal laser sintering (DMLS), selective laser melting (SLM), or electron beam melting (EBM). In some cases, the green part may be generated using direct light processing (DLP) or stereolithography (SLA).

The green part may include a plurality of reactants. Table 1 below shows one or more components of the plurality of reactants used to conduct a self-propagating reaction to generate heat in the green part. The plurality of reactants may include, for example, an oxidizer, a fuel, and/or a solvent. The oxidizer may be ammonium nitrate ($NH_4NO_3$), nitric acid ($HNO_3$), a metal nitrate, a nitrate hydrate, a functional variant thereof, or a combination thereof. The metal nitrate may comprise a nitrate ion and a metal. The nitrate hydrate may comprise a nitrate ion and one or more water molecules. The fuel may be urea ($CH_4N_2O$), glycine ($C_2H_5NO_2$), sucrose ($C_{12}H_{22}O_{11}$), glucose, citric acid, a functional variant thereof, or a combination thereof. In some cases, the fuel may be a hydrazine based fuel (e.g., carbohydrazide, oxalyldihydrazide, hexamethylenetetramine, acetylacetone, a functional variant thereof, or a combination thereof). The solvent may be water, a hydrocarbon (e.g., kerosene or benzene), and/or an alcohol (e.g., ethanol, methanol, furfuryl alcohol, 2-methoxyethanol, or formaldehyde).

TABLE 1

| Oxidizer | Fuel | Solvent |
| --- | --- | --- |
| metal nitrates or nitrate hydrates: Me"($NO_3$)$_v$·$nH_2O$ v- metal valance ammonium nitrate ($NH_4NO_3$) Nitric Acid ($HNO_3$) | urea ($CH_4N_2O$) glycine ($C_2H_5NO_2$) Sucrose ($C_{12}H_{22}O_{11}$) Glucose Citric Acid Hydrazine Based Fuel: Carbohydrazide Oxalyldihydrazide hexamethyl-enetetramine acetylacetone | water ($H_2O$) Hydrocarbons: kerosene Benzene Alcohols: Ethanol Methanol Furfuryl Alcohol 2-methoxyethanol Formaldehyde |

The reactants may be used to conduct a self-propagating reaction. The self-propagating reaction may generate heat within the green part. The heat generated by the self-propagating reaction may be used to de-bind and/or pre-sinter the green part. De-binding may include, for example, using heat to evaporate the polymeric material or at least a portion of the polymeric material that encapsulates the plurality of particles in the green part. In some cases, de-binding may involve using heat to solubilize or vaporize at least a portion of the polymeric material and/or binder in the green part. Solubilizing may involve the use of heat to remove at least a portion of the polymeric material or binder from the green part in a liquid form. Vaporizing may involve the use of heat to remove at least a portion of the polymeric material or binder from the green part in gas or vapor form. De-binding the green part by solubilizing or vaporizing at least a portion of the polymeric material or binder in the green part may create one or more pores in at least a portion of the green part. The one or more pores may create a continuous porous network in at least a portion of the green part. In other cases, de-binding may involve using heat to decompose the polymeric material and/or binder in the green part. Decomposing the polymeric material and/or binder in the green part may involve using heat to remove at least a portion of the polymeric material and/or binder from the green part in a gas, liquid, or vapor form. In some cases, decomposing the polymeric material and/or binder may involve removing at least a portion of the polymeric material and/or binder through the one or more pores in the green part. Decomposing and/or de-binding the polymeric material and/or binder may involve using heat to remove at least a portion of the green part that does not include the plurality of particles.

The heat generated by the self-propagating reaction may be used to pre-sinter the green part. Pre-sintering may involve using heat to remove at least a portion of a binder or a polymeric material from the green part. Pre-sintering may involve using heat to remove at least a portion of the polymeric material or binder from the green part in part through one or more pores in the green part. Pre-sintering may involve using heat to partially fuse one or more of a plurality of particles together at one or more grain boundaries between the one or more of the plurality of particles in the green part. Alternatively, pre-sintering may involve using heat to partially close one or more pores or a porous network created in a green part during de-binding. Pre-sintering may occur at a pre-sintering temperature. The pre-sintering temperature may be less than a sintering temperature. A sintering temperature may be a temperature at which one or more of a plurality of particles in a green part can fuse together at one or more grain boundaries between the one or more of the plurality of particles in the green part.

The sintering temperature may be less than one or more melting temperatures of the one or more of the plurality of particles in a green part.

The self-propagating reaction may comprise one or more oxidation (e.g., combustion) reactions that generate heat sufficient to propagate the one or more oxidation reactions from at least a first portion of the green part to at least a second portion of the green part, such as by initiating the one or more oxidation reactions from at least the first portion to at least the second portion or beyond. The one or more oxidation reactions may include one or more combustion reactions. The at least a first portion of the green part may have one or more common boundaries with the at least a second portion of the green part. An oxidation reaction may be a reaction between an oxidizer or a plurality of oxidizers and the plurality of reactants. An oxidizer may be a substance that removes one or more electrons from a reactant during a chemical reaction. The oxidizer may be oxygen, ozone, fluorine, chlorine, bromine, iodine, hypochlorite, chlorate, nitric acid, sulphur dioxide, chromate, manganate, permanganate, tetroxide, peroxide, or thallium. The one or more oxidation reactions may generate heat within the green part. The self-propagating reaction may generate heat within the green part by the one or more oxidation reactions. Upon initiation, the self-propagating reaction may proceed without energy input into the green part from an external energy source.

The self-propagating reaction may propagate from at least a first portion of a green part to at least a second portion of a green part through a combustion wave. A combustion wave may be a mobile or stationary boundary area between one or more portions of the green part. A first portion of the green part may be located on a first side of the combustion wave. A second portion of the green part may be located on a second side of the combustion wave. The plurality of reactants in the first portion of the green part may generate heat sufficient to initiate one or more oxidation reactions in at least a second portion of the green part or beyond. The heat generated from the one or more oxidation reactions in the first portion of the green party may be sufficient to initiate one or more oxidation reactions in at least a second portion of the green part. The heat generated from the one or more oxidation reactions may be sufficient to de-bind or pre-sinter the green part.

In some cases, the self-propagating reaction may involve a solution combustion process. The solution combustion process may involve exposing the plurality of reactants to a source of external energy (e.g., a source of light or thermal energy) to activate (e.g., boil off) the solvent. In some cases, the solvent may boil off and leave a material comprising the oxidizer, and/or the fuel. The material may be solid, semi-solid, crystalline, and/or semi-crystalline. In some cases, such material may be reduced in a reduction process (e.g., a reduction reaction). A reduction reaction may involve one or more components (e.g., the oxidizer and/or fuel) of the material losing an oxygen atom and/or gaining one or more electrons. The reduction process may generate or emit heat. In some cases, the heat generated or emitted may induce one or more fuels present in the reactants to burn and/or combust. In some cases, the reactants may comprise one or more oxygen donating species (e.g., the oxidizer). The one or more oxygen donating species may provide oxygen to the fuel to allow the fuel to burn and/or initiate a self-propagating reaction. The amount of heat generated and/or emitted by the reduction reaction and/or the self-propagating reaction may be related in part to the ratio of fuel to oxidizer and/or the amount of oxidizer present. As the self-propagating reaction proceeds, the plurality of particles in the green part may fuse or partially fuse. Alternatively, as the self-propagating reaction proceeds, a portion of the polymeric material and/or binder in the green part may be decomposed and/or removed from the green part.

The self-propagating reaction may have a temperature of oxidation (e.g., temperature of combustion). The temperature of oxidation may be approximately equal to the temperature at which the one or more oxidation reactions occur. The temperature of oxidation may range between about 300 degrees Celsius to about 2200 degrees Celsius. The temperature of oxidation may be at least about 300 degrees Celsius, 350 degrees Celsius, 400 degrees Celsius, 450 degrees Celsius, 500 degrees Celsius, 550 degrees Celsius, 600 degrees Celsius, 650 degrees Celsius, 700 degrees Celsius, 750 degrees Celsius, 800 degrees Celsius, 850 degrees Celsius, 900 degrees Celsius, 950 degrees Celsius, 1000 degrees Celsius, 1050 degrees Celsius, 1100 degrees Celsius, 1150 degrees Celsius, 1200 degrees Celsius, 1250 degrees Celsius, 1300 degrees Celsius, 1350 degrees Celsius, 1400 degrees Celsius, 1450 degrees Celsius, 1500 degrees Celsius, 1550 degrees Celsius, 1600 degrees Celsius, 1700 degrees Celsius, 1800 degrees Celsius, 1900 degrees Celsius, 2000 degrees Celsius, 2100 degrees Celsius, 2200 degrees Celsius, or more. The temperature of oxidation may be at most about 2200 degrees Celsius, 2100 degrees Celsius, 2000 degrees Celsius, 1900 degrees Celsius, 1800 degrees Celsius, 1700 degrees Celsius, 1600 degrees Celsius, 1550 degrees Celsius, 1500 degrees Celsius, 1450 degrees Celsius, 1400 degrees Celsius, 1350 degrees Celsius, 1300 degrees Celsius, 1250 degrees Celsius, 1200 degrees Celsius, 1150 degrees Celsius, 1100 degrees Celsius, 1050 degrees Celsius, 1000 degrees Celsius, 950 degrees Celsius, 900 degrees Celsius, 850 degrees Celsius, 800 degrees Celsius, 750 degrees Celsius, 700 degrees Celsius, 650 degrees Celsius, 600 degrees Celsius, 550 degrees Celsius, 500 degrees Celsius, 450 degrees Celsius, 400 degrees Celsius, 350 degrees Celsius, 300 degrees Celsius, or less.

The heat generated from the self-propagating reaction may be sufficient to de-bind and/or pre-sinter at least a portion of the green part. In some cases, de-binding may involve using heat to solubilize or vaporize at least a portion of the polymeric material and/or binder in a green part. The heat from the one or more oxidation reactions may be-bind the green part by solubilizing or vaporizing at least a portion of the polymeric material or binder from the green part. Solubilizing may involve the use of heat to remove at least a portion of the polymeric material or binder from the green part in a liquid form. Vaporizing may involve the use of heat to remove at least a portion of the polymeric material or binder from the green part in gas or vapor form. De-binding the green part by solubilizing or vaporizing at least a portion of a polymeric material or binder in the green part may create one or more pores in at least a portion of the green part. The one or more pores may create a continuous porous network in at least a portion of the green part. In other cases, de-binding may involve using heat generated from the one or more oxidation reactions to decompose the polymeric material and/or binder in a green part. Decomposing the polymeric material and/or binder in the green part may involve using heat to remove at least a portion of the polymeric material and/or binder from the green part in a gas, liquid, or vapor form. In some cases, decomposing the polymeric material and/or binder may involve removing at least a portion of the polymeric material and/or binder through one or more pores in the green part. The heat generated by the self-propagating reaction and/or the one or more oxidation reactions may be sufficient to de-bind the green part by removing at least a portion of the green part that does not include the plurality of particles.

The heat generated from the self-propagating reaction may be sufficient to pre-sinter at least a portion of the green part. Pre-sintering may involve, for example, using heat to remove at least a portion of a binder or a polymeric material from a green part. Pre-sintering may involve using heat to remove at least a portion of a polymeric material or binder from the green part in part through one or more pores in the green part. Pre-sintering may involve using heat to partially fuse one or more of a plurality of particles together at one or more grain boundaries between the one or more of the plurality of particles in the green part. Alternatively, pre-sintering may involve using heat to partially close one or more pores or a porous network created in a green part during de-binding. Pre-sintering may involve using the heat generated by the one or more oxidation reactions to remove at least a portion of the binder or polymeric material in the green part. Pre-sintering may involve using the heat generated by the one or more oxidation reactions to remove at least a portion of the polymeric material or binder from the green part in part through one or more pores in the green part. In some cases, pre-sintering may involve using the heat generated from the one or more oxidation reactions to partially fuse one or more of a plurality of particles together at one or more grain boundaries between the one or more of the plurality of particles in the green part. In other cases, pre-sintering may involve using the heat generated by the one or more oxidation reactions to partially close the one or more pores or the porous network created in a green part during de-binding. Pre-sintering may occur at a pre-sintering temperature. The pre-sintering temperature may be less than a sintering temperature. A sintering temperature may be a temperature at which one or more of a plurality of particles in a green part can fuse together at one or more grain boundaries between the one or more of the plurality of particles in the green part. The sintering temperature may be less than a melting temperature of one or more of a plurality of particles in a green part.

The self-propagating reaction may be initiated by supplying a source of energy to reactants. The source of energy may provide the reactants sufficient energy to undergo one or more oxidation reactions. The source of energy may be a source of external energy. The source of external energy may be a light source. Examples of a light source may include lamps (e.g., incandescent lamps, halogen lamps, carbon arc lamps, or discharge lamps), torches, lasers, light emitting diodes (LEDs), super luminescent diodes (SLDs), gas-filled tubes such as fluorescent bulbs, or any other equipment capable of producing a stream of photons. A light source may emit electromagnetic waves with a wavelength ranging from about 200 nm to about 700 nm. A light source may include sources of ultraviolet light. The source of external energy may be a convective or resistive energy source, such as a source of a hot fluid (e.g., hot air) or a resistive heater.

The source of external energy used to initiate the self-propagating reaction may be a source of thermal energy. Examples of a source of thermal energy may include lamps (e.g., incandescent lamps, halogen lamps, carbon arc lamps, or discharge lamps), torches, lasers, heaters, furnaces, or an open flame. A furnace may be an enclosed chamber with heat energy supplied by fuel combustion, electricity, conduction, convection, induction, radiation, or any combination thereof. The source of thermal energy may provide thermal energy through resistive heating. Resistive heating may include heating achieved by passing an electrical current through a material. The material may be a conducting material with a resistance property that may impede the movement of electrons through the material or cause electrons to collide with each other, thereby generating heat. The source of thermal energy may provide thermal energy through induction heating. Induction heating may involve the use of electromagnetic induction to generate electrical currents inside a conducting material. The source of thermal energy may provide thermal energy by dielectric heating. Dielectric heating may involve the use of radio wave or microwave electromagnetic radiation to cause the rotation of molecules within a material. The source of thermal energy may be a processing chamber. The temperature of the processing chamber may be regulated using any one or more sources of thermal energy disclosed herein. The processing chamber may be an oven or a furnace. The oven or furnace may be heated with various heating approaches, such as resistive heating, convective heating and/or radiative heating. The furnace may be, for example, an induction furnace, electric arc furnace, gas-fired furnace, plasma arc furnace, microwave furnace, or an electric resistance furnace. Such heating may be employed at a fixed or variable heating rate from an initial temperature to a target temperature or temperature range. Once initiated, the self-propagating reaction may be sustained to completion without continuous exposure to a source of external energy.

The heat generated by the one or more oxidation reactions comprising the self-propagating reaction may be sufficient to de-bind the green part. For example, the heat generated by the one or more oxidation reactions may be sufficient to remove at least a portion of the polymeric material or binder from the green part. The heat generated from the one or more oxidation reactions may remove at least a portion of the polymeric material or binder from the green part by solubilizing or vaporizing the at least the portion of the polymeric material or binder. Solubilizing may involve the use of heat to remove at least a portion of the polymeric material or binder from the green part in a liquid form. Vaporizing may involve the use of heat to remove at least a portion of the polymeric material or binder from the green part in gas or vapor form. The heat generated by the self-propagating reaction and/or the one or more oxidation reactions may be sufficient to remove at least a portion of the green part that does not include the plurality of particles. De-binding by solubilizing or vaporizing may create one or more pores in a portion of the green part. The one or more pores may create a continuous porous network in a portion of the green part. In some cases, de-binding may involve removing at least a portion of the polymeric material and/or binder in part through the one or more pores in the green part.

The heat generated by the one or more oxidation reactions comprising the self-propagating reaction may be sufficient to pre-sinter the green part. Pre-sintering may involve, for example, using the heat generated by the one or more oxidation reactions to remove at least a portion of a binder or a polymeric material in the green part. Pre-sintering may involve using the heat generated from the one or more oxidation reactions to remove at least a portion of the polymeric material or binder from the green part in part through one or more pores in the green part. In some cases, pre-sintering may involve using the heat generated from the one or more oxidation reactions to partially fuse one or more of a plurality of particles together at one or more grain boundaries between the one or more of the plurality of particles in the green part. In other cases, pre-sintering may involve using the heat generated by the one or more oxidation reactions to partially close the one or more pores or the porous network created in a green part during de-binding.

After the green part undergoes de-binding and/or pre-sintering, heat may be supplied to the green part from a location external to the green part to sinter the plurality of particles within the green part to yield a 3D object. Sintering may involve using heat to fuse one or more of a plurality of particles together at one or more grain boundaries between the one or more of the plurality of particles in the green part. In some cases, sintering may involve using heat to close the one or more pores or the porous network created in a green part during de-binding. In other cases, sintering may involve using heat to remove at least a portion of the polymeric material or binder remaining in the green part after de-binding and/or pre-sintering. The heat for sintering may be supplied by a light source. Examples of a light source may include lamps, torches, lasers, light emitting diodes (LEDs), super luminescent diodes (SLDs), gas-filled tubes such as fluorescent bulbs, or any other equipment capable of producing a stream of photons. A light source may emit electromagnetic waves with a wavelength ranging from about 200 nm to about 700 nm. A light source may include sources of ultraviolet light. The light source used for sintering may be located external to the green part.

Alternatively, the heat for sintering may be supplied by a source of thermal energy. Examples of a source of thermal energy may include lamps, torches, lasers, heaters, furnaces, or an open flame. A furnace may be an enclosed chamber with heat energy supplied by fuel combustion, electricity, conduction, convection, induction, radiation, or any combination thereof. The source of thermal energy may provide thermal energy through resistive heating. Resistive heating may include heating achieved by passing an electrical current through a material. The material may be a conducting material with a resistance property that may impede the movement of electrons through the material or cause electrons to collide with each other, thereby generating heat. The source of thermal energy may provide thermal energy through induction heating. Induction heating may involve the use of electromagnetic induction to generate electrical currents inside a conducting material. The source of thermal energy may provide thermal energy by dielectric heating. Dielectric heating may involve the use of radio wave or microwave electromagnetic radiation to cause the rotation of molecules within a material. In some cases, the source of thermal energy may be a processing chamber. The temperature of the processing chamber may be regulated with any source of thermal energy disclosed herein. The processing chamber may be an oven or a furnace. The oven or furnace may be heated with various heating approaches, such as resistive heating, convective heating and/or radiative heating. Examples of the furnace include an induction furnace, electric arc furnace, gas-fired furnace, plasma arc furnace, microwave furnace, and electric resistance furnace. Such heating may be employed at a fixed or variating heating rate from an initial temperature to a target temperature or temperature range. The source of thermal energy used for sintering may be located external to the green part.

Figure 1:
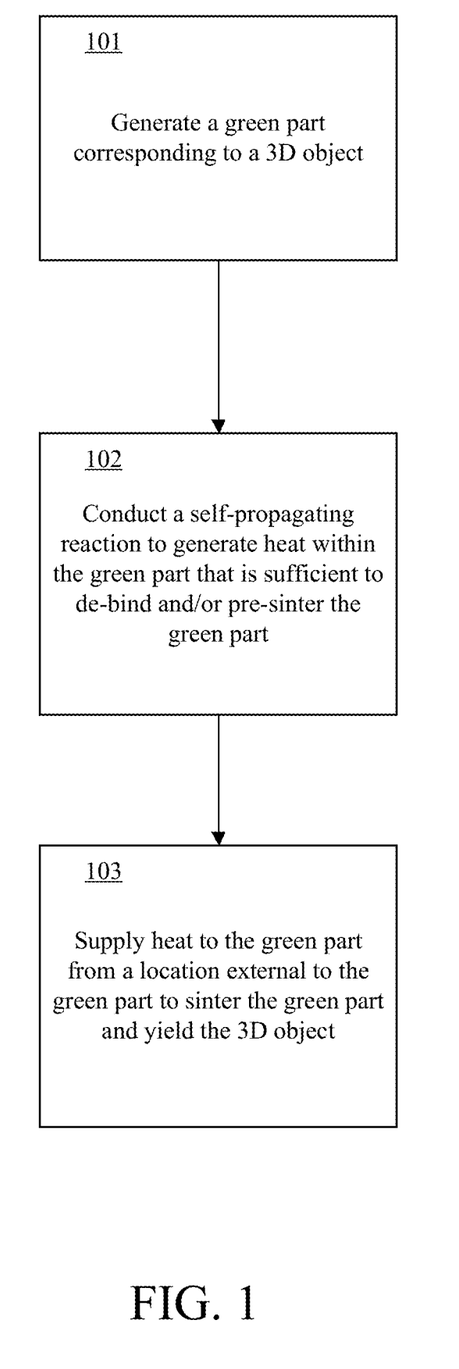
FIG. 1 schematically illustrates a method for generating a three-dimensional (3D) object using a self-propagating reaction, in accordance with some embodiments.

FIG. 1 illustrates an example of a method for generating a three-dimensional (3D) object. As shown in FIG. 1, in a first operation 101, the 3D object may be generated by first generating a green part corresponding to the 3D object. The green part may comprise a plurality of particles and reactants for conducting a self-propagating reaction in the green part to yield heat. Next, in a second operation 102, the reactants may be used to conduct a self-propagating reaction to generate heat in the green part. The heat may be sufficient to de-bind or pre-sinter the green part. Subsequently, in a third operation 103, heat may be supplied to the green part from a location external to the green part to sinter the plurality of particles in the green part to yield the 3D object.

The green part may be generated using at least one viscous liquid. The viscous liquid may be a resin. A resin may be a viscous liquid that is usable to print a 3D object. The resin may be dispensed from a nozzle and over a print window. The resin may have a viscosity sufficient to be self-supporting without flowing or sufficient flowing. The viscosity of the resin may range between about 4,000 centipoise (cP) to about 2,000,000 cP. The resin may be pressed (e.g., by a blade or a build head) into a film of the resin on or over a print window. A thickness of the film of the resin may be adjustable.

The resin may include a photoactive resin. The photoactive resin may include a polymeric precursor and a photoinitiator. A polymeric precursor may be a polymerizable and/or cross-linkable component, such as a monomer, for example. A photoinitiator may be a compound that activates curing of the polymerizable and/or cross-linkable component, thereby subjecting the polymerizable and/or cross-linkable component to polymerization and/or cross-linking. Polymerization may be a process of reacting monomers together to form one or more chains of polymers. Polymerization may include step-growth polymerization, chain-growth polymerization, or photopolymerization. Step-growth polymerization may involve reactions between monomers with one or more functional groups to form polymer chains. Chain-growth polymerization may involve reactions between one or monomers and an initiator to add monomer molecules onto one or more active sites of a polymer chain. An initiator may be a compound that reacts with monomers to form an intermediate compound. The intermediate compound may be capable of linking one or more monomers into a polymer chain. Photopolymerization may be a chain-growth polymerization initiated by the absorption of visible or ultraviolet light. Cross-linking may be a process of joining two or more polymer chains together by using a chemical reaction to form covalent bonds between two or more polymer chains.

The photoactive resin may include a photoinhibitor that inhibits curing of the polymerizable and/or cross-linkable component. In some examples, the resin may include a plurality of particles (e.g., metal, non-metal, or both) —in such a case, the resin may be a slurry or a photopolymer slurry. The resin may be a paste. The plurality of particles may be added to the resin. The plurality of particles may be solids or semi-solids (e.g., gels). Examples of non-metal material include ceramic, polymeric, or composite material. The plurality of particles may be suspended throughout the resin. The plurality of particles in the resin may have a distribution that is monodisperse or polydisperse. In some examples, the resin may contain additional optical absorbers and/or non-photoreactive components (e.g., fillers, binders, plasticizers, etc.). The 3D printing methods disclosed herein may be performed with at least 1, 2, 3, 4, 5, 6, 7, 8, 9, 10 or more resins. A plurality of resins comprising different materials (e.g., different photoactive resin and/or different plurality of particles) may be used for printing a multi-material 3D object.

A resin may be used for printing the at least the portion of the 3D object. The resin may comprise a photoactive resin to form a polymeric material. The photoactive resin may comprise a polymeric precursor of the polymeric material. The photoactive resin may comprise at least one photoinitiator that is configured to initiate formation of the polymeric material from the polymeric precursor. The photoactive resin may comprise at least one photoinhibitor that is configured to inhibit formation of the polymeric material from the polymeric precursor. The photoactive resin may comprise a plurality of particles for forming the at least the portion of the 3D object.

The photoactive resin may have a viscosity. The viscosity of the photoactive resin may range between about 4,000 cP to about 2,000,000 cP. The viscosity of the photoactive resin may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the photoactive resin may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

The photoactive resin may be a non-Newtonian fluid. The viscosity of the photoactive resin may vary based on a shear rate or shear history of the photoactive resin. As an alternative, the photoactive resin may be a Newtonian fluid.

The resin may comprise a photoactive resin and a plurality of particles. The viscosity of the resin may range between about 4,000 cP to about 2,000,000 cP. The viscosity of the resin may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the resin may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

In the resin comprising the photoactive resin and the plurality of particles, the photoactive resin may be present in an amount ranging between about 5 volume % (vol %) to about 80 vol % in the resin. The photoactive resin may be present in an amount of at least about 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 30 vol %, 35 vol %, 40 vol %, 45 vol %, 50 vol %, 55 vol %, 60 vol %, 65 vol %, 70 vol %, 75 vol %, 80 vol %, or more in the resin. The photoactive resin may be present in an amount of at most about 80 vol %, 75 vol %, 70 vol %, 65 vol %, 60 vol %, 55 vol %, 50 vol %, 45 vol %, 40 vol %, 35 vol %, 30 vol %, 25 vol %, 24 vol %, 23 vol %, 22 vol %, 21 vol %, 20 vol %, 19 vol %, 18 vol %, 17 vol %, 16 vol %, 15 vol %, 14 vol %, 13 vol %, 12 vol %, 11 vol %, 10 vol %, 9 vol %, 8 vol %, 7 vol %, 6 vol %, 5 vol %, or less in the resin.

The polymeric precursor in the photoactive resin may comprise monomers to be polymerized into the polymeric material, oligomers to be cross-linked into the polymeric material, or both. The monomers may be of the same or different types. An oligomer may comprise two or more monomers that are covalently linked to each other. The oligomer may be of any length, such as at least 2 (dimer), 3 (trimer), 4 (tetramer), 5 (pentamer), 6 (hexamer), 7, 8, 9, 10, 20, 30, 40, 50, 100, 200, 300, 400, 500, or more monomers. Alternatively or in addition, the polymeric precursor may include a dendritic precursor (monodisperse or polydisperse). The dendritic precursor may be a first generation (G1), second generation (G2), third generation (G3), fourth generation (G4), or higher with functional groups remaining on the surface of the dendritic precursor. The resulting polymeric material may comprise a monopolymer and/or a copolymer. The copolymer may be a linear copolymer or a branched copolymer. The copolymer may be an alternating copolymer, periodic copolymer, statistical copolymer, random copolymer, and/or block copolymer.

Examples of monomers include one or more of hydroxyethyl methacrylate; n-Lauryl acrylate; tetrahydrofurfuryl methacrylate; 2,2,2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2,2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetraethyleneglycol diacrylate; tetraethylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; and ditrimethylolpropane tetraacrylate.

Polymeric precursors may be present in an amount ranging between about 3 weight % (wt %) to about 90 wt % in the photoactive resin of the viscous liquid. The polymeric precursors may be present in an amount of at least about 3 wt %, 4 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or more in the photoactive resin of the viscous liquid. The polymeric precursors may be present in an amount of at most about 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, 4 wt %, 3 wt %, or less in the photoactive resin of the viscous liquid.

Photopolymerization of the polymeric precursors into the polymeric material may be controlled by one or more photoactive species, such as the at least one photoinitiator and the at least one photoinhibitor. The at least one photoinitiator may be configured to initiate formation of the polymeric material from the polymeric precursor. For example, the at least one photoinitiator may be a photon-absorbing compound that (i) is activated by a first light comprising a first wavelength and (ii) initiates photopolymerization of the polymeric precursors. The at least one photoinhibitor may be configured to inhibit formation of the polymeric material from the polymeric precursor. For example, the at least one photoinhibitor may be another photon-absorbing compound that (i) is activated by a second light comprising a second wavelength and (ii) inhibits the photopolymerization of the polymeric precursors. The first wavelength and the second wavelength may be different. The first light and the second light may be directed by the same light source. Alternatively, the first light may be directed by a first light source and the second light may be directed by a second light source. In some cases, the first light may comprise wavelengths ranging between about 420 nanometers (nm) to about 510 nm. The second light may comprise wavelengths ranging between about 350 nm to about 410 nm. In an example, the first wavelength to induce photoinitiation may be about 460 nm. The second wavelength to induce photoinhibition may be about 365 nm.

Relative rates of the photoinitiation by the at least one photoinitiator and the photoinhibition by the at least one photoinhibitor may be controlled by adjusting the intensity and/or duration of the first light, the second light, or both. By controlling the relative rates of the photoinitiation and the photoinhibition, an overall rate and/or amount (degree) of polymerization of the polymeric precursors into the polymeric material may be controlled. Such a process may be used to (i) prevent polymerization of the polymeric precursors at an interface between a print window and the resin, (ii) control the rate at which polymerization takes place in the direction away from the print window, and/or (iii) control a thickness of the polymeric material within the film of the viscous liquid and/or resin.

The photoinitiator may be a photon-absorbing compound that (i) is activated by a first light comprising a first wavelength and (ii) initiates photopolymerization of the polymeric precursors. Examples of photoinitiators include one or more of benzophenones, thioxanthones, anthraquinones, benzoylformate esters, hydroxyacetophenones, alkylaminoacetophenones, benzil ketals, dialkoxyacetophenones, benzoin ethers, phosphine oxides acyloximino esters, alphahaloacetophenones, trichloromethyl-S-triazines, titanocenes, dibenzylidene ketones, ketocoumarins, dye sensitized photoinitiation systems, maleimides, and mixtures thereof. Examples of photoinitiators in a photoactive resin include one or more of 1-hydroxy-cyclohexyl-phenyl-ketone (Irgacure™ 184; BASF, Hawthorne, NJ); a 1:1 mixture of 1-hydroxy-cyclohexyl-phenyl-ketone and benzophenone (Irgacure™ 500; BASF); 2-hydroxy-2-methyl-1-phenyl-1-propanone (Darocur™ 1173; BASF); 2-hydroxy-1-[4-(2-hydroxyethoxy)phenyl]-2-methyl-1-propanone (Irgacure™ 2959; BASF); methyl benzoylformate (Darocur™ MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]ethyl ester and oxy-phenyl-acetic 2-[2-hydroxy-ethoxy]-ethyl ester (Irgacure™ 754; BASF); alpha,alpha-dimethoxy-alpha-phenylacetophenone (Irgacure™ 651; BASF); 2-benzyl-2-(dimethylamino)-1-[4-(4-morpholinyl)-phenyl]-1-butanone (Irgacure™ 369; BASF); 2-methyl-1-[4-(methylthio)phenyl]-2-(4-morpholinyl)-1-propanone (Irgacure™ 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (Irgacure™ 1300; BASF); diphenyl-(2,4,6-trimethylbenzoyl) phosphine oxide (Darocur™ TPO; BASF); a 1:1 mixture of diphenyl-(2,4,6-trimethylbenzoyl)-phosphine oxide and 2-hydroxy-2-methyl-1-phenyl-1-propanone (Darocur™ 4265; BASF); phenyl bis(2,4,6-trimethyl benzoyl) phosphine oxide, which can be used in pure form (Irgacure™ 819; BASF, Hawthorne, NJ) or dispersed in water (45% active, Irgacure™ 819DW; BASF); 2:8 mixture of phosphine oxide, phenyl bis(2,4,6-trimethyl benzoyl) and 2-hydroxy-2-methyl-1-phenyl-1-propanone (Irgacure™ 2022; BASF); Irgacure™ 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (Irgacure™ 784; BASF); (4-methylphenyl) [4-(2-methylpropyl) phenyl]-iodonium hexafluorophosphate (Irgacure™ 250; BASF); 2-(4-methylbenzyl)-2-(dimethylamino)-1-(4-morpholinophenyl)-butan-1-one (Irgacure™ 379; BASF); 4-(2-hydroxyethoxy)phenyl-(2-hydroxy-2-propyl)ketone (Irgacure™ 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2 hydroxy-2-methyl-1-phenyl-propanone (Irgacure™ 1700; BASF); 4-Isopropyl-9-thioxanthenone; and mixtures thereof.

The at least one photoinitiator may be present in an amount ranging between about 0.1 wt % to about 10 wt % in the photoactive resin. The at least one photoinitiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The at least one photoinitiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The at least one photoinhibitor may be another photon-absorbing compound that (i) is activated by a second light comprising a second wavelength and (ii) inhibits the photopolymerization of the polymeric precursors. The at least one photoinhibitor in the photoactive resin may comprise one or more radicals that may preferentially terminate growing polymer radicals, rather than initiating polymerization of the polymeric precursors. Examples of types of the at least one photoinitiator include: one or more of sulfanylthiocarbonyl and other radicals generated in photoiniferter polymerizations; sulfanylthiocarbonyl radicals used in reversible addition-fragmentation chain transfer polymerization; and nitrosyl radicals used in nitroxide mediate polymerization. Other non-radical species that can be generated to terminate growing radical chains may include the numerous metal/ligand complexes used as deactivators in atom-transfer radical polymerization (ATRP). Thus, additional examples of the types of the at least one photoinhibitor include: one or more of thiocarbamates, xanthates, dithiobenzoates, hexaarylbiimidazoles, photoinitiators that generate ketyl and other radicals that tend to terminate growing polymer chains radicals (i.e., camphorquinone (CQ) and benzophenones), ATRP deactivators, and polymeric versions thereof.

Examples of the at least one photoinhibitors in the photoactive resin include one or more of zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-Rdo-decylsulfanylthiocarbonyl)sulfanylpentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl] trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio] propionate; 1-Succinimidyl-4-cyano-4-[N-methyl-N-(4-pyridyl)carbamothioylthio]pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; 2,2'-Bis(2-chlorophenyl)-4,4',5,5'-tetraphenyl-1,2'-biimidazole; 2-(2-ethoxyphenyl)-1-[2-(2-ethoxyphenyl)-4,5-diphenyl-2H-imidazol-2-yl]-4,5-diphenyl-1H-imidazole; 2,2',4-tris(2-Chlorophenyl)-5-(3,4-dimethoxyphenyl)-4',5'-diphenyl-1,1'-biimidazole; and Methyl 2-[methyl(4-pyridinyl)carbamothioylthio]propionate.

The at least one photoinhibitor may be present in an amount ranging between about 0.1 wt % to about 10 wt % in the photoactive resin. The at least one photoinhibitor may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 7 wt %, 8 wt %, 9 wt %, 10 wt %, or more in the photoactive resin. The at least one photoinhibitor may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

Alternatively or in addition, the photoactive resin may include a co-initiator. The co-initiator may be used to enhance the polymerization rate of the polymeric precursors. Suitable classes of the co-initiators may include: primary, secondary, and tertiary amines; alcohols; and thiols. Examples of the co-initiators may include: one or more of isoamyl 4-(dimethylamino) benzoate, 2-ethylhexyl 4-(dimethylamino)benzoate; ethyl 4-(dimethylamino)benzoate (EDMAB); 3-(dimethylamino)propyl acrylate; 2-(dimethylamino)ethyl methacrylate; 4-(dimethylamino) benzophenones, 4-(diethylamino)benzophenones; 4,4'-Bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (Sartomer); CN371 (Sartomer), CN373 (Sartomer), Genomer 5142 (Rahn); Genomer 5161 (Rahn); Genomer 5271 (Rahn); Genomer 5275 (Rahn), and TEMPIC (Bruno Boc, Germany).

In some cases, the at least one photoinitiator and the co-initiator may be activated by the same light. The at least one photoinitiator and the co-initiator may be activated by the same wavelength and/or two different wavelengths of the same light. Alternatively or in addition, the at last one photoinitiator and the co-initiator may be activated by different lights comprising different wavelengths. The system may comprise a co-initiator light source configured to direct a co-initiation light comprising a wavelength sufficient to activate the co-initiator to the film of the viscous liquid.

The co-initiator may be a small molecule (e.g., a monomer). Alternatively or in addition, the co-initiator may be an oligomer or polymer comprising a plurality of small molecules. The co-initiator may be present in an amount ranging between about 0.1 wt % to about 10 wt % in the photoactive resin. The co-initiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The co-initiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The resin may further comprise a plurality of particles and reactants for conducting a self-propagating reaction. The reactants may include an oxidizer, a fuel, and/or a solvent. The oxidizer may be ammonium nitrate ($NH_4NO_3$), nitric acid ($HNO_3$), a metal nitrate, a nitrate hydrate, a functional variant thereof, or a combination thereof. The metal nitrate may comprise a nitrate ion and a metal. The nitrate hydrate may comprise a nitrate ion and one or more water molecules. The fuel may be urea ($CH_4N_2O$), glycine ($C_2H_5NO_2$), sucrose ($C_{12}H_{22}O_{11}$), glucose, citric acid, a functional variant thereof, or a combination thereof. In some cases, the fuel may be a hydrazine based fuel (e.g., carbohydrazide, oxalyldihydrazide, hexamethylenetetramine, acetylacetone, a functional variant thereof, or a combination thereof). The solvent may be water, a hydrocarbon (e.g., kerosene or benzene), and/or an alcohol (e.g., ethanol, methanol, furfuryl alcohol, 2-methoxyethanol, or formaldehyde).

In some cases, the plurality of reactants may comprise a solvent. Upon exposing the plurality of reactants in the resin to a source of external energy, the solvent may boil off. In some cases, the solvent may boil off and leave a material comprising the oxidizer and/or the fuel. The material may be solid, semi-solid, crystalline, and/or semi-crystalline. In some cases, such material may be reduced in a reduction process (e.g., a reduction reaction). A reduction reaction may involve one or more components (e.g., the oxidizer and/or fuel) of the material losing an oxygen atom and/or gaining one or more electrons. The reduction process may generate or emit heat. In some cases, the heat generated or emitted may induce one or more fuels present in the reactants to burn and/or combust. In some cases, the reactants may comprise one or more oxygen donating species (e.g., the oxidizer). The one or more oxygen donating species may provide oxygen to the fuel to allow the fuel to burn and/or initiate a self-propagating reaction comprising one or more oxidation reactions. The amount of heat generated and/or emitted by the reduction reaction and/or the one or more oxidation reactions may be related in part to the ratio of fuel to oxidizer and/or the amount of oxidizer present. As the self-propagating reaction proceeds, the plurality of particles in the green part may fuse or partially fuse. Alternatively, as the self-propagating reaction proceeds, a portion of the polymeric material and/or binder in the green part may be decomposed and/or removed from the green part.

The photoactive resin may comprise one or more dyes. The one or more dyes may be used to attenuate light, to transfer energy to the photoactive species, or both. The one or more dyes may transfer energy to the photoactive species to increase sensitivity of the photoactive resin to the first light for the photoinitiation process, the second light for the photoinhibition process, or both. In an example, the photoactive resin comprises at least one dye configured to absorb the second light having the second wavelength, which second wavelength is for activating the at least one photoinhibitor. Exposing the photoactive resin to the second light may initiate the at least one dye to absorb the second light and (i) reduce an amount of the second light exposed to the at least one photoinhibitor, thereby controlling the depth of penetration of the second light into the film of the viscous liquid, and/or (ii) transfer (e.g., via Förster resonance energy transfer (FRET)) some of the absorbed energy from the second light to the at least one photoinhibitor, thereby improving the efficiency of photoinhibition. Examples of the one or more dyes may include compounds commonly used as ultraviolet (UV) light absorbers, including 2-hydroxyphenyl-benzophenones, 2-(2-hydroxyphenyl)-benzotriazoles, and 2-hydroxyphenyl-s-triazines. Alternatively or in addition, the one or more dyes may include those used for histological staining or dying of fabrics, including Martius yellow, Quinoline yellow, Sudan red, Sudan I, Sudan IV, eosin, eosin Y, neutral red, and acid red.

A concentration of the one or more dyes in the photoactive resin may be dependent on the light absorption properties of the one or more dyes. The one or more dyes may be present in an amount ranging between about 0.1 wt % to about 10 wt % in the photoactive resin. The one or more dyes may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The one or more dyes may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

Another aspect of the present disclosure provides a green part for forming a three-dimensional object. The green part may comprise a plurality of particles and reactants for conducting a self-propagating reaction in the green part, as described previously. The self-propagating reaction in the green part may yield heat in the green part. Such heat may be sufficient to de-bind or pre-sinter the green part, as described previously. The green part may be processed (e.g., heated) to yield at least a portion of the final 3D object.

Another different aspect of the present disclosure provides a method for forming a three-dimensional (3D) object. The method may comprise providing adjacent to a build surface a resin comprising (i) a binder configured to decompose at a first temperature, (ii) a polymeric precursor configured to form a polymeric material, wherein the polymeric material is configured to decompose at a second temperature that is greater than the first temperature, and (iii) a plurality of particles. A build surface may be any surface on which a resin may be placed, dispensed, or deposited (e.g., an open platform comprising a print window) for use with any one or more 3D printing methods described herein. A binder may be any compound or resin that retains or partially retains the plurality of particles comprising a green part in a shape corresponding to the 3D object or a portion of the 3D object. The binder may comprise poly(propylene carbonate) or paraformaldehyde. The polymeric precursor may be a polymerizable and/or cross-linkable component, such as a monomer, for example. The polymeric precursor may be configured to form a polymeric material by polymerization of monomers into the polymeric material and/or cross-linking of oligomers into the polymeric material. For example, the polymeric precursor may form the polymeric material when a photoinitiator in the resin is activated by a first light comprising a first wavelength and subsequently initiates polymerization and/or cross-linking of the polymeric precursors. The polymeric material may be a polymer (or polymeric) network. The plurality of particles may comprise at least one metal particle, at least one ceramic particle, or a combination thereof. The plurality of particles may be encapsulated in the polymer (or polymeric) network.

The resin may be used to generate a green part corresponding to the 3D object using any one or more 3D printing methods disclosed herein. The green part may comprise a binder, the polymeric material, and/or the plurality of particles. The binder may be configured to decompose at a first temperature. Decomposing the binder may involve heating the green part to a first temperature and removing the binder from the green part by solubilizing and/or vaporizing the at least a portion of the binder. Solubilizing may involve the use of heat to remove the at least a portion of the binder from the green part in a liquid form. Vaporizing may involve the use of heat to remove at least a portion of the binder from the green part in gas or vapor form. The polymeric material may be configured to decompose at a second temperature. Decomposing the polymeric material may involve heating the green part to a second temperature and removing the polymeric material from the green part by solubilizing and/or vaporizing the at least the portion of the polymeric material. Solubilizing may involve the use of heat to remove at least a portion of the polymeric material from the green part in a liquid form. Vaporizing may involve the use of heat to remove at least a portion of the polymeric material from the green part in gas or vapor form.

The green part may be heated at a first temperature to decompose at least a portion of the binder and to generate one or more pores in the green part. After heating the green part to a first temperature to decompose at least a portion of the binder, the green part may comprise the polymeric material and the plurality of particles. Subsequently, the green part may be heated at or above a second temperature to decompose at least a portion of the polymeric material, thereby generating a green part comprising the plurality of particles. Decomposing the polymeric material and/or binder may involve heating the green part at or above the second temperature to remove at least a portion of the polymeric material and/or binder through one or more pores in the green part.

In some cases, heating the green part at a first temperature may decompose at least a portion of the binder, but may not decompose the polymeric material. Alternatively, heating the green part at a first temperature may decompose at least a portion of the polymeric material in the green part. In some cases, heating the green part at a first temperature may yield one or more pores in at least a portion of the 3D object. The one or more pores may be a plurality of pores. In other cases, heating the green part at a first temperature may yield at least one continuous porous network in the green part. The at least one continuous porous network may comprise the one or more pores in at least a portion of the 3D object.

Heating the green part at a first temperature may cause the binder to decompose into a gas. The gas may comprise carbon monoxide, carbon dioxide, water, and/or formaldehyde.

In some cases, heating the green part at or above the second temperature may decompose at least a portion of the binder and/or the polymeric material in the green part. Decomposing the polymeric material and/or binder may involve heating the green part at or above the second temperature to remove at least a portion of the polymeric material and/or binder through one or more pores in the green part. In some cases, heating the green part at or above the second temperature may subject the plurality of particles to sintering. Sintering may involve fusing one or more of a plurality of particles together at one or more grain boundaries between the one or more of the plurality of particles in the green part. In some cases, sintering may involve closing the one or more pores or the porous network created in a green part during de-binding. In other cases, sintering may involve removing at least a portion of the binder and/or polymeric material remaining in the green part after debinding and/or pre-sintering.

The green part may be heated to the first temperature and/or the second temperature using any one or more sources of thermal energy, as disclosed elsewhere herein. Examples of a source of thermal energy may include lamps, torches, lasers, heaters, furnaces, or an open flame. A furnace may be an enclosed chamber with heat energy supplied by fuel combustion, electricity, conduction, convection, induction, radiation, or any combination thereof. The source of thermal energy may provide thermal energy through resistive heating. Resistive heating may include heating achieved by passing an electrical current through a material. The material may be a conducting material with a resistance property that may impede the movement of electrons through the material or cause electrons to collide with each other, thereby generating heat. The source of thermal energy may provide thermal energy through induction heating. Induction heating may involve the use of electromagnetic induction to generate electrical currents inside a conducting material. The source of thermal energy may provide thermal energy by dielectric heating. Dielectric heating may involve the use of radio wave or microwave electromagnetic radiation to cause the rotation of molecules within a material. In some cases, the source of thermal energy may be a processing chamber. The temperature of the processing chamber may be regulated with any one or more sources of thermal energy disclosed herein. The processing chamber may be an oven or a furnace. The oven or furnace may be heated with various heating approaches, such as resistive heating, convective heating and/or radiative heating. Examples of the furnace include an induction furnace, electric arc furnace, gas-fired furnace, plasma arc furnace, microwave furnace, and electric resistance furnace. Such heating may be employed at a fixed or variating heating rate from an initial temperature to a target temperature or temperature range. The one or more sources of thermal energy used to heat the green part to the first temperature and/or the second temperature may be located external to the green part.

The first temperature may range from about 150 degrees Celsius to about 350 degrees Celsius. The first temperature may be at least about 150 degrees Celsius, 160 degrees Celsius, 170 degrees Celsius, 180 degrees Celsius, 190 degrees Celsius, 200 degrees Celsius, 210 degrees Celsius, 220 degrees Celsius, 230 degrees Celsius, 240 degrees Celsius, 250 degrees Celsius, 260 degrees Celsius, 270 degrees Celsius, 280 degrees Celsius, 290 degrees Celsius, 300 degrees Celsius, 310 degrees Celsius, 320 degrees Celsius, 330 degrees Celsius, 340 degrees Celsius, 350 degrees Celsius, or more. The first temperature may be at most about 350 degrees Celsius, 340 degrees Celsius, 330 degrees Celsius, 320 degrees Celsius, 310 degrees Celsius, 300 degrees Celsius, 290 degrees Celsius, 280 degrees Celsius, 270 degrees Celsius, 260 degrees Celsius, 250 degrees Celsius, 240 degrees Celsius, 230 degrees Celsius, 220 degrees Celsius, 210 degrees Celsius, 200 degrees Celsius, 190 degrees Celsius, 180 degrees Celsius, 170 degrees Celsius, 160 degrees Celsius, 150 degrees Celsius, or less.

The second temperature may be greater than or equal to about 400 degrees Celsius. In some cases, the second temperature may be greater than or equal to about 500 degrees Celsius. The second temperature may be at least about 400 degrees Celsius, 450 degrees Celsius, 500 degrees Celsius, 550 degrees Celsius, 600 degrees Celsius, 650 degrees Celsius, 700 degrees Celsius, 750 degrees Celsius, 800 degrees Celsius, 850 degrees Celsius, 900 degrees Celsius, 950 degrees Celsius, 1000 degrees Celsius, 1050 degrees Celsius, 1100 degrees Celsius, 1150 degrees Celsius, 1200 degrees Celsius, 1250 degrees Celsius, 1300 degrees Celsius, 1350 degrees Celsius, 1400 degrees Celsius, 1450 degrees Celsius, 1500 degrees Celsius, 1550 degrees Celsius, 1600 degrees Celsius, 1700 degrees Celsius, 1800 degrees Celsius, 1900 degrees Celsius, 2000 degrees Celsius, 2100 degrees Celsius, 2200 degrees Celsius, or more.

The resin may comprise at least one photoinitiator that is configured to initiate formation of a polymeric material from the polymeric precursor, as previously described herein. For example, the at least one photoinitiator may be a photon-absorbing compound that (i) is activated by a first light comprising a first wavelength and (ii) initiates photopolymerization of the polymeric precursors. The resin may further comprise at least one photoinhibitor that is configured to inhibit formation of the polymeric material from the polymeric precursor, as previously described herein. For example, the at least one photoinhibitor may be another photon-absorbing compound that (i) is activated by a second light comprising a second wavelength and (ii) inhibits the photopolymerization of the polymeric precursors.

The methods disclosed herein may further comprise exposing the resin adjacent to the build surface to a first light under conditions sufficient to cause the at least one photoinitiator to initiate formation of the polymeric material from the polymeric precursor, as previously described herein. The methods disclosed herein may further comprise exposing the resin adjacent to the build surface to a second light under conditions sufficient to cause the at least one photoinhibitor to inhibit formation of the polymeric material adjacent to the build surface, as previously described herein.

The first light may comprise a first wavelength and the second light may comprise a second wavelength. The first and second wavelengths may be different. The first wavelength may be sufficient to activate the at least one photoinitiator, and the second wavelength may be sufficient to activate the at least one photoinhibitor. The first light may be a photoinitiation light, and the second light may be a photoinhibition light. The methods disclosed herein may further comprise directing the photoinitiation light to the resin to initiate formation the polymeric material from the polymeric precursor. The methods disclosed herein may further comprise directing the photoinhibition light to the resin to inhibit formation of the polymeric material adjacent to the build surface.

The build surface may comprise an optically transparent or semi-transparent window. Accordingly, any one or more of the methods disclosed herein may further comprise exposing the resin to the photoinitiation light and/or the photoinhibition light through the optically transparent or semi-transparent window. In some cases, the methods disclosed herein may further comprise directing the photoinitiation light and/or the photoinhibition light through the optically transparent or semi-transparent window.

Figure 2:
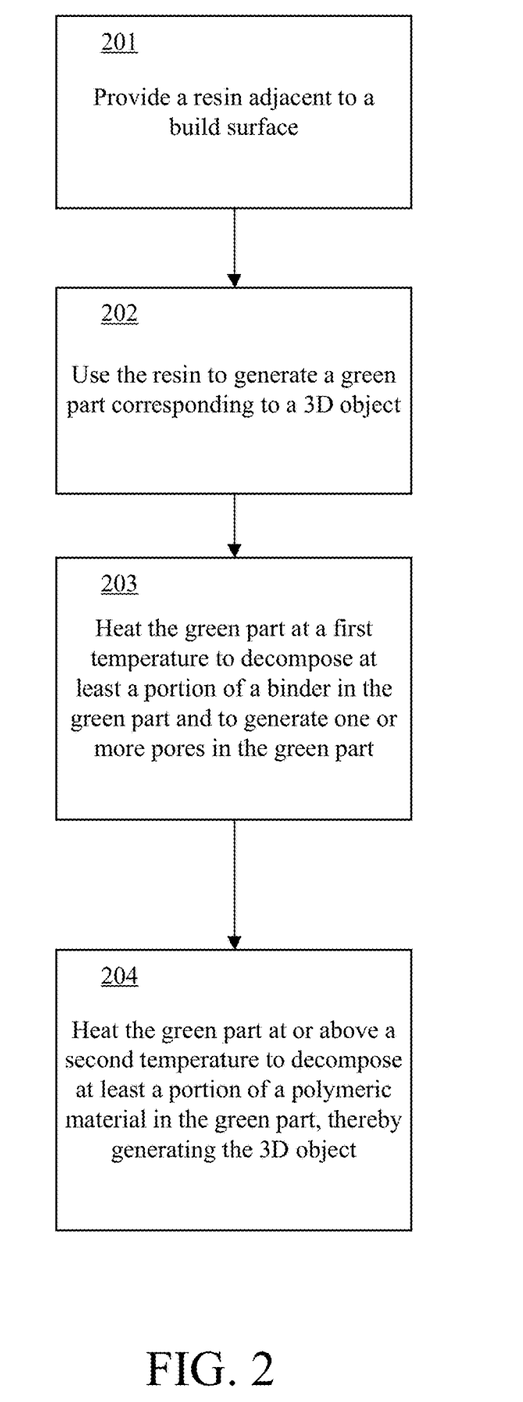
FIG. 2 schematically illustrates a method for generating a three-dimensional (3D) object using one or more thermal decomposition operations, in accordance with some embodiments.

FIG. 2 illustrates an example of a method for generating a three-dimensional (3D) object. As shown in FIG. 2, in a first operation 201, the 3D object may be generated by first providing a resin adjacent to a build surface. The resin may comprise a binder configured to decompose at a first temperature, a polymeric precursor configured to form a polymeric material, and a plurality of particles. The polymeric material may be configured to decompose at a second temperature that is greater than the first temperature. Next, in a second operation 202, the resin may be used to generate a green part corresponding to the 3D object. The green part may comprise the binder, the polymeric material, and the plurality of particles. Afterwards, in a third operation 203, the green part may be heated at the first temperature to decompose at least a portion of the binder and to generate one or more pores in the green part. Subsequently, in a fourth operation 204, the green part may be heated at or above the second temperature to decompose at least a portion of the polymeric material, thereby generating the 3D object.

Computer Systems

Figure 3:
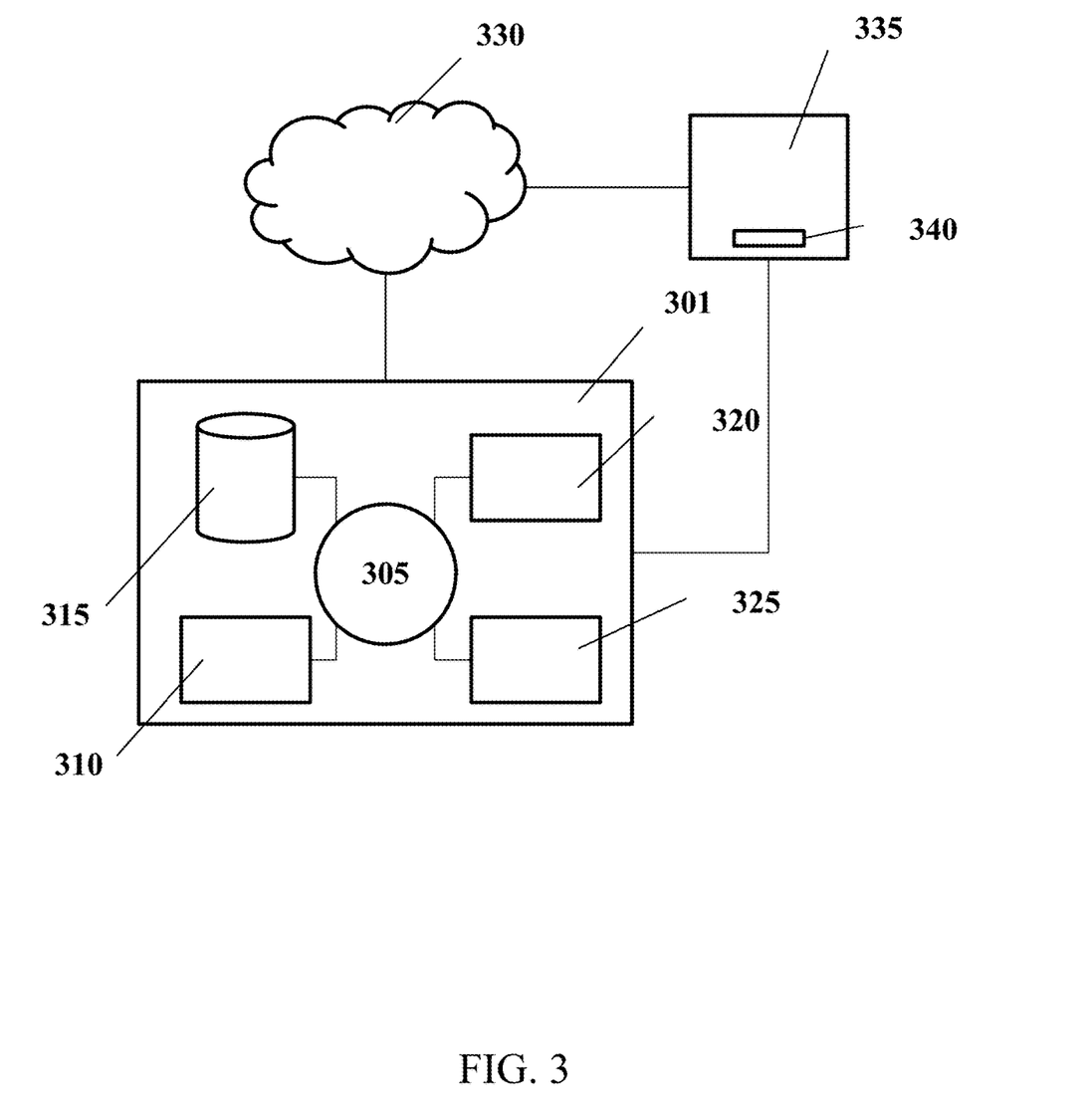
FIG. 3 schematically illustrates a computer system that is programmed or otherwise configured to implement methods provided herein.

Another aspect of the present disclosure provides computer systems that are programmed or otherwise configured to implement methods of the disclosure. FIG. 3 shows a computer system 301 that is programmed or otherwise configured to implement a method for generating a three-dimensional (3D) object. The computer system 301 can control the generation of a green part in a desired shape based on a 3D object, the use of external sources of energy to initiate a self-propagating reaction to de-bind or pre-sinter a green part, the use of external sources of heat to heat the green part to a first temperature to remove a binder from the green part, the use of external sources of heat to heat the green part to a second temperature to remove a polymeric precursor from the green part, and/or the use of external sources of heat to sinter the green part. The computer system 301 can be an electronic device of a user or a computer system that is remotely located with respect to the electronic device. The electronic device can be a mobile electronic device.

The computer system 301 includes a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user (e.g., an end user, a consumer, an engineer, a designer, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340 for providing, for example, a portal for monitoring the generation of a three-dimensional (3D) object. A user can use the portal to control the de-binding, pre-sintering, or sintering of the green part, or use the portal to view information relating to material properties (e.g. density or volume) of the green part before, during, and/or after de-binding, pre-sintering, and/or sintering. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm may be configured to control the computer system to generate a green part in a desired shaped corresponding to a three-dimensional (3D) object. The algorithm may also be configured to control a source of external energy to supply external energy to reactants in a green part to initiate a self-propagating reaction that generates heat sufficient to de-bind and/or pre-sinter a green part. The algorithm may be further configured to control a source of energy external to the green part to supply heat to the green part and to sinter a plurality of particles in a green part to yield the desired 3D object. Alternatively, the algorithm may be configured to control the computer system to generate a green part using a resin. The algorithm may be configured to control one or more sources of light to initiate and/or inhibit formation of a polymeric material in the green part using precursors in the resin. The algorithm may be further configured to control a source of thermal energy to heat the green part at a first temperature to decompose a portion of a binder in the green part. The algorithm may be further configured to control a source of thermal energy to heat the green part at a second temperature to decompose a portion of a polymeric material in the green part. The algorithm may be further configured to control a source of thermal energy to heat the green part and sinter a plurality of particles in the green part to yield the desired 3D object.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a three-dimensional (3D) object, comprising:
   (a) providing adjacent to a build surface a resin comprising (i) a binder configured to decompose at a first temperature, (ii) a polymeric precursor configured to form a polymeric material, wherein said polymeric material is configured to decompose at a second temperature that is greater than said first temperature, and (iii) a plurality of particles;
   (b) using said resin to generate a green part corresponding to said 3D object, wherein said green part comprises said binder, said polymeric material, and said plurality of particles;
   (c) heating said green part at said first temperature to decompose at least a portion of said binder and generate one or more pores in said green part, which green part comprises said plurality of particles and said polymeric material, wherein said first temperature is from about 150 degrees Celsius to about 350 degrees Celsius, and wherein said heating at said first temperature does not decompose said polymeric material; and
   (d) subsequent to (c), heating said green part at or above said second temperature to decompose at least a portion of said polymeric material, thereby generating said 3D object comprising said plurality of particles.

2. The method of claim 1, wherein said plurality of particles comprise at least one metal particle, at least one ceramic particle, or a combination thereof.

3. The method of claim 1, wherein in (d), said heating subjects said plurality of particles to sintering.

4. The method of claim 1, wherein said heating in (c) yields at least one continuous porous network in said green part, which at least one continuous porous network comprises said one or more pores.

5. The method of claim 1, wherein in (a) said resin further comprises at least one photoinitiator configured to initiate formation of said polymeric precursor into said polymeric material.

6. The method of claim 5, further comprising, in (b), exposing said resin adjacent to said build surface to a photoinitiation light under conditions sufficient to cause said at least one photoinitiator to initiate formation of said polymeric material from said polymeric precursor.

7. The method of claim 1, wherein in (a), said resin further comprises at least one photoinhibitor configured to inhibit formation of said polymeric material from said polymeric precursor.

8. The method of claim 7, further comprising, in (b), exposing said resin adjacent to said build surface to a photoinhibition light under conditions sufficient to cause said at least one photoinhibitor to inhibit formation of said polymeric material adjacent to said build surface.

9. The method of claim 1, wherein in (c), said at least said portion of said binder decomposes into a gas.

10. The method of claim 9, wherein said gas comprises carbon monoxide, carbon dioxide, water, or formaldehyde.

11. The method of claim 1, wherein said binder comprises poly(propylene carbonate) or paraformaldehyde.

12. The method of claim 1, wherein said second temperature is greater than or equal to about 400 degrees Celsius.

13. The method of claim 12, wherein said second temperature is greater than or equal to about 500 degrees Celsius.

14. The method of claim 1, wherein (b) comprises directing a photoinitiation light to said resin to form said polymeric material from said polymeric precursor.

15. The method of claim 14, wherein said build surface comprises a transparent or semi-transparent window, and wherein said photoinitiation light is directed through said transparent or semi-transparent window.

16. The method of claim 1, wherein said polymeric material is removable through said one or more pores when said green part is heated at or above said second temperature.

17. The method of claim 1, wherein said heating in (c) removes said at least said portion of said binder from said green part in a liquid form.

18. The method of claim 1, further comprising, subsequent to (d), supplying heat to said green part to sinter said plurality of particles.

19. The method of claim 1, wherein said first temperature is from about 150 degrees Celsius to about 300 degrees Celsius.

20. The method of claim 1, wherein said first temperature is from about 150 degrees Celsius to about 250 degrees Celsius.

* * * * *